H. C. H. COOPER.
VOTING MACHINE.
APPLICATION FILED MAR. 11, 1898.

1,031,170.

Patented July 2, 1912.

9 SHEETS—SHEET 2.

H. C. H. COOPER.
VOTING MACHINE.
APPLICATION FILED MAR. 11, 1898.
1,031,170.
Patented July 2, 1912.
9 SHEETS—SHEET 3.
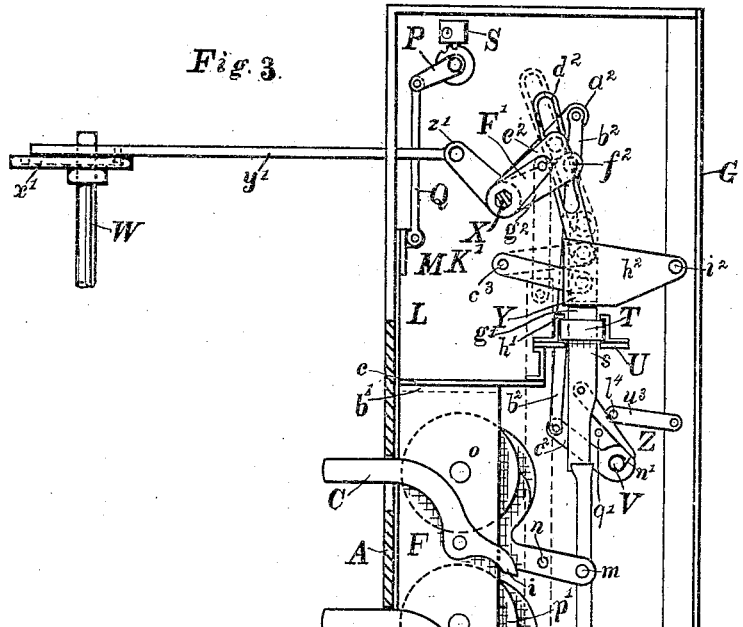
Fig. 3.
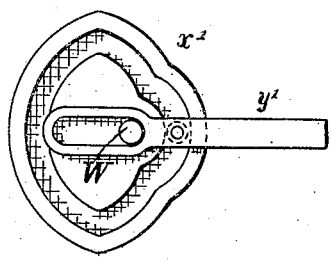
Fig. 15
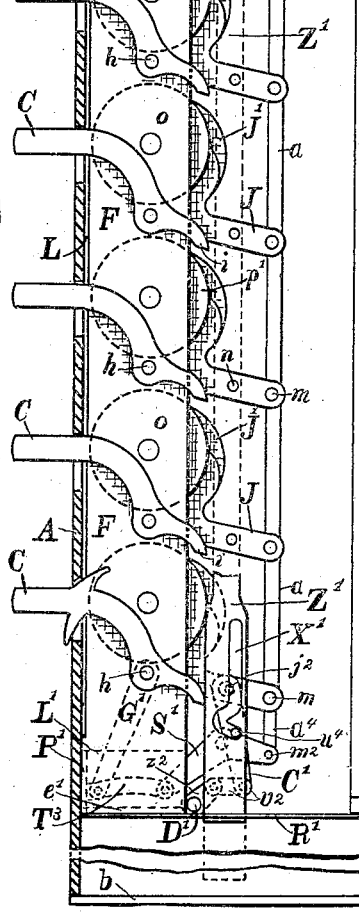
Witnesses:
Geo Wilson
C. G. Crannell
Inventor:
H. C. H. Cooper.
By Geo. B. Selden,
atty.

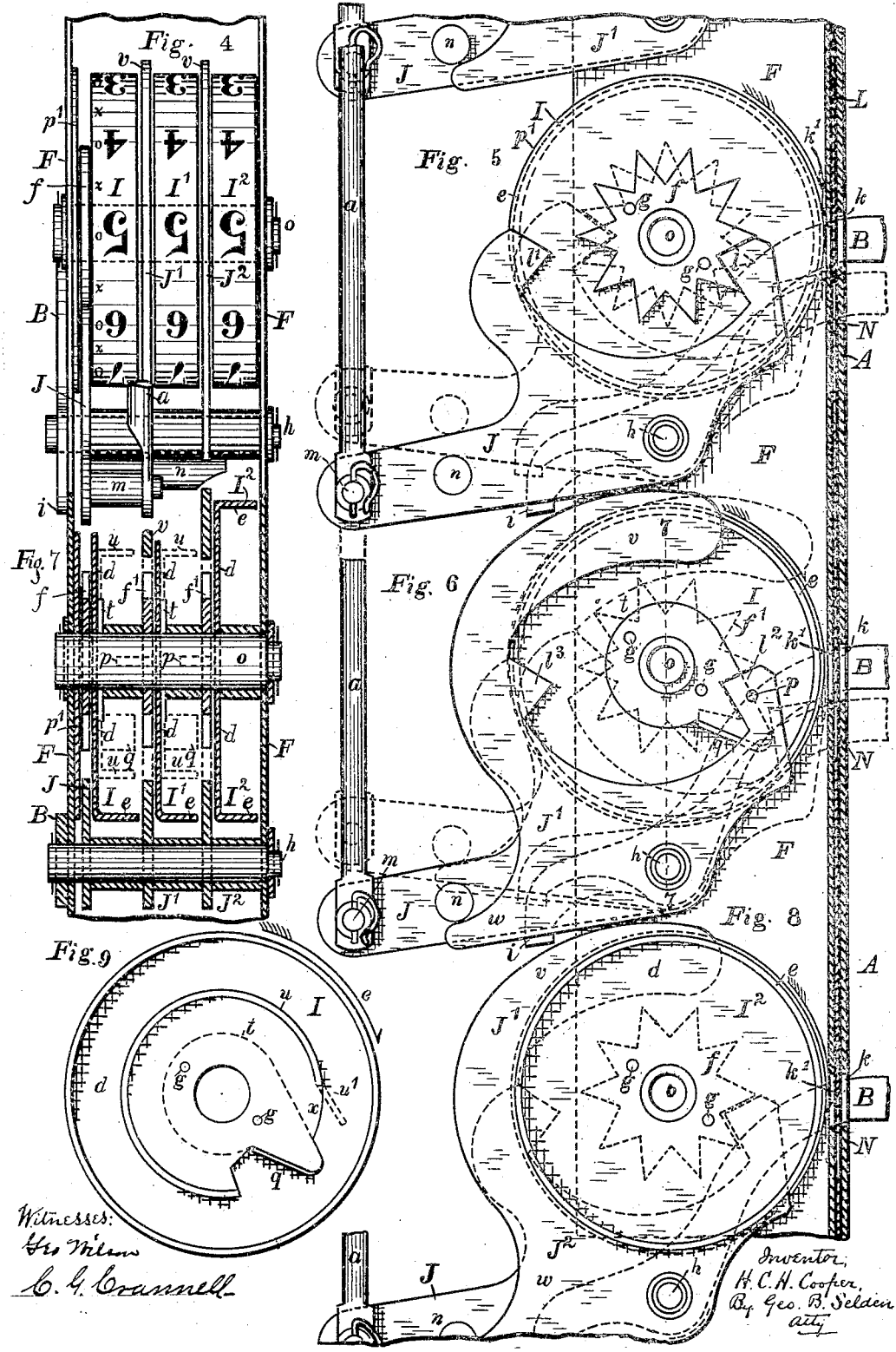

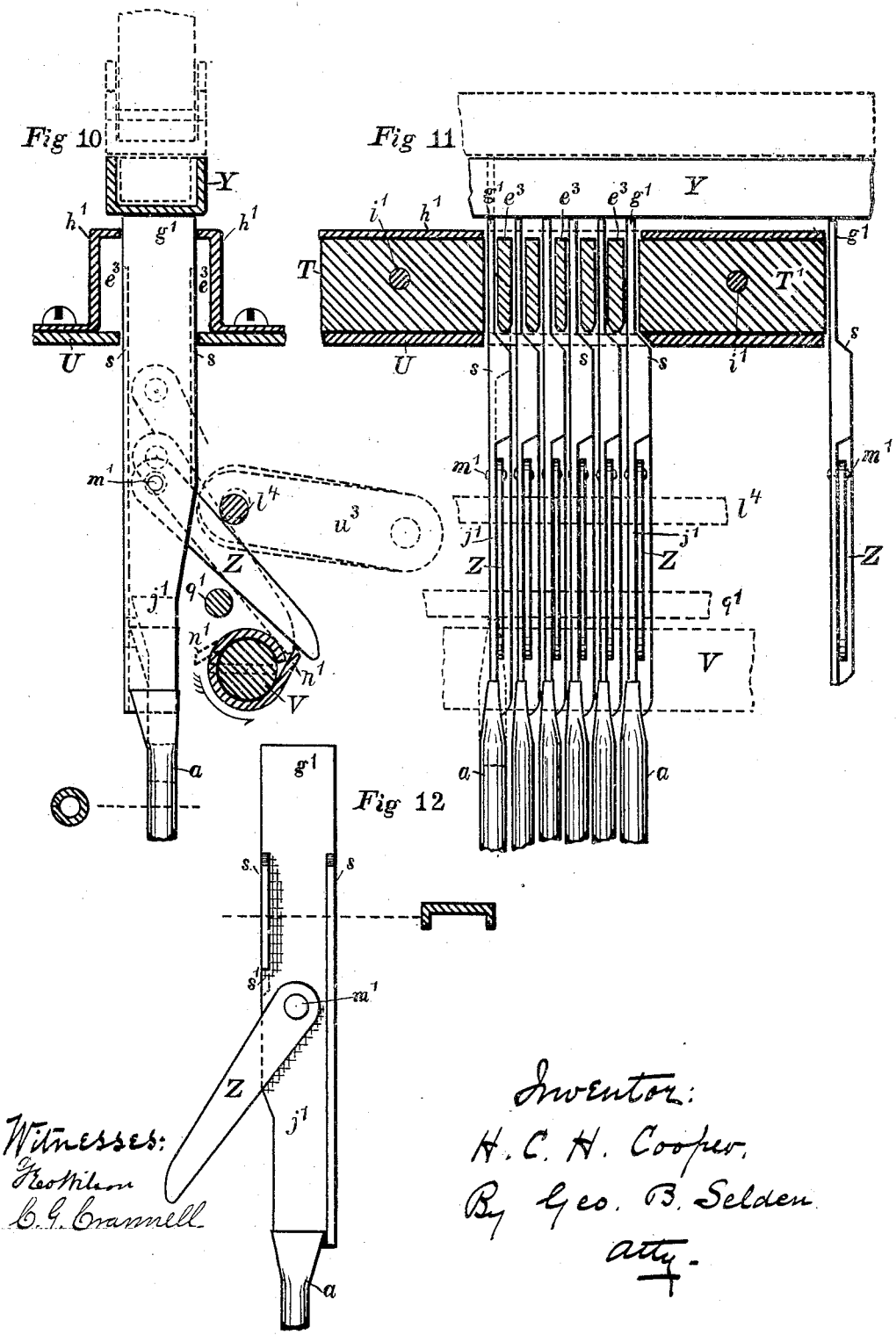

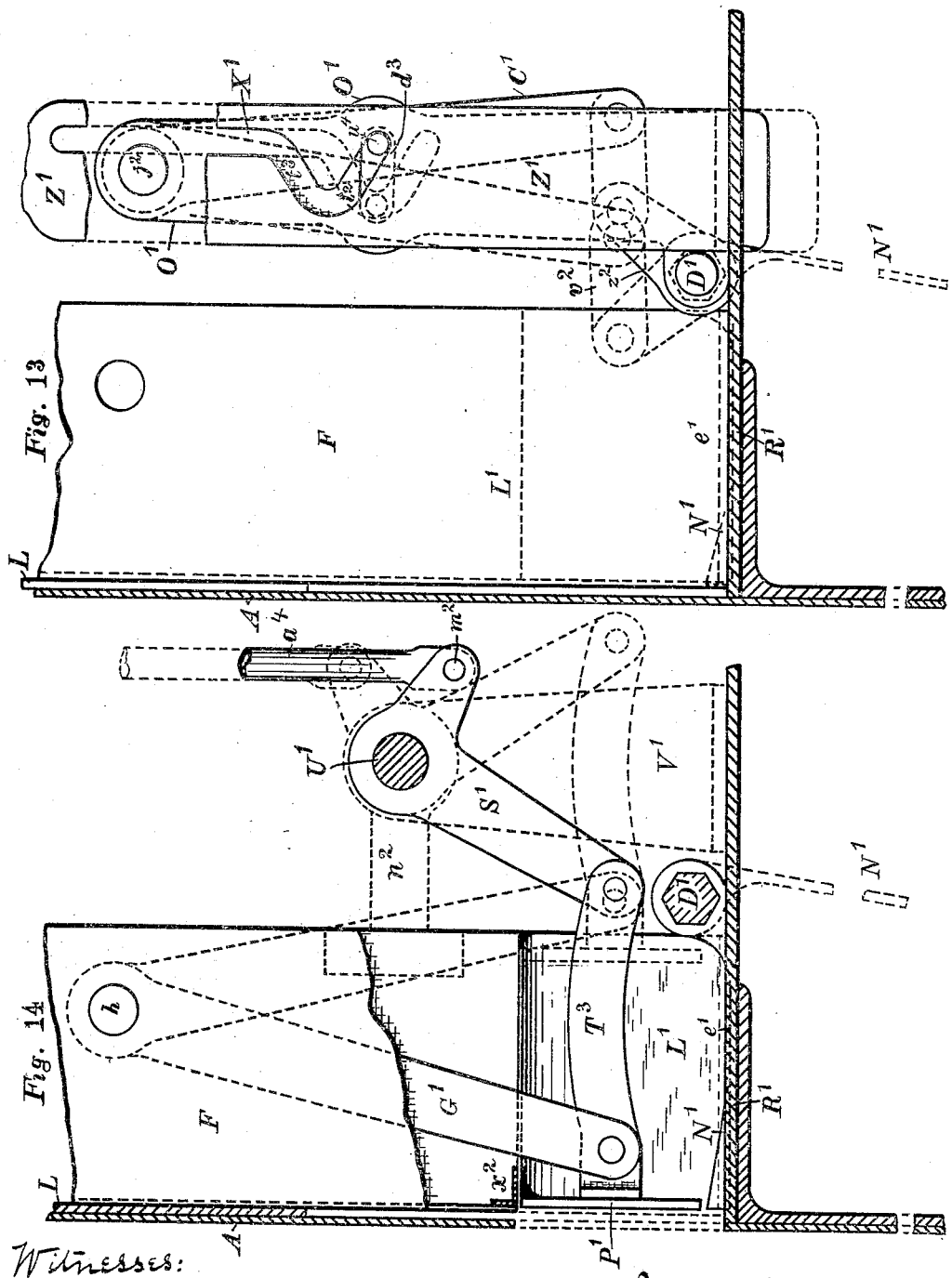

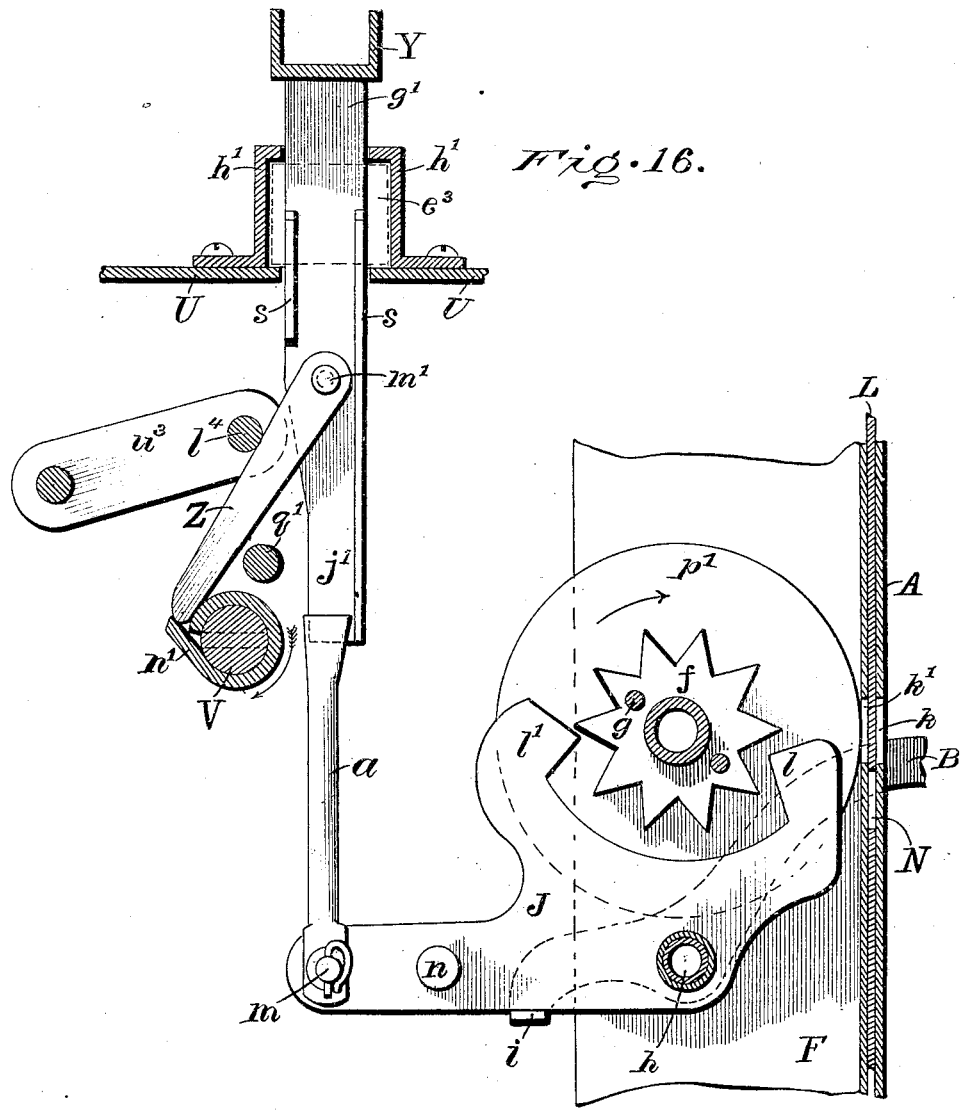

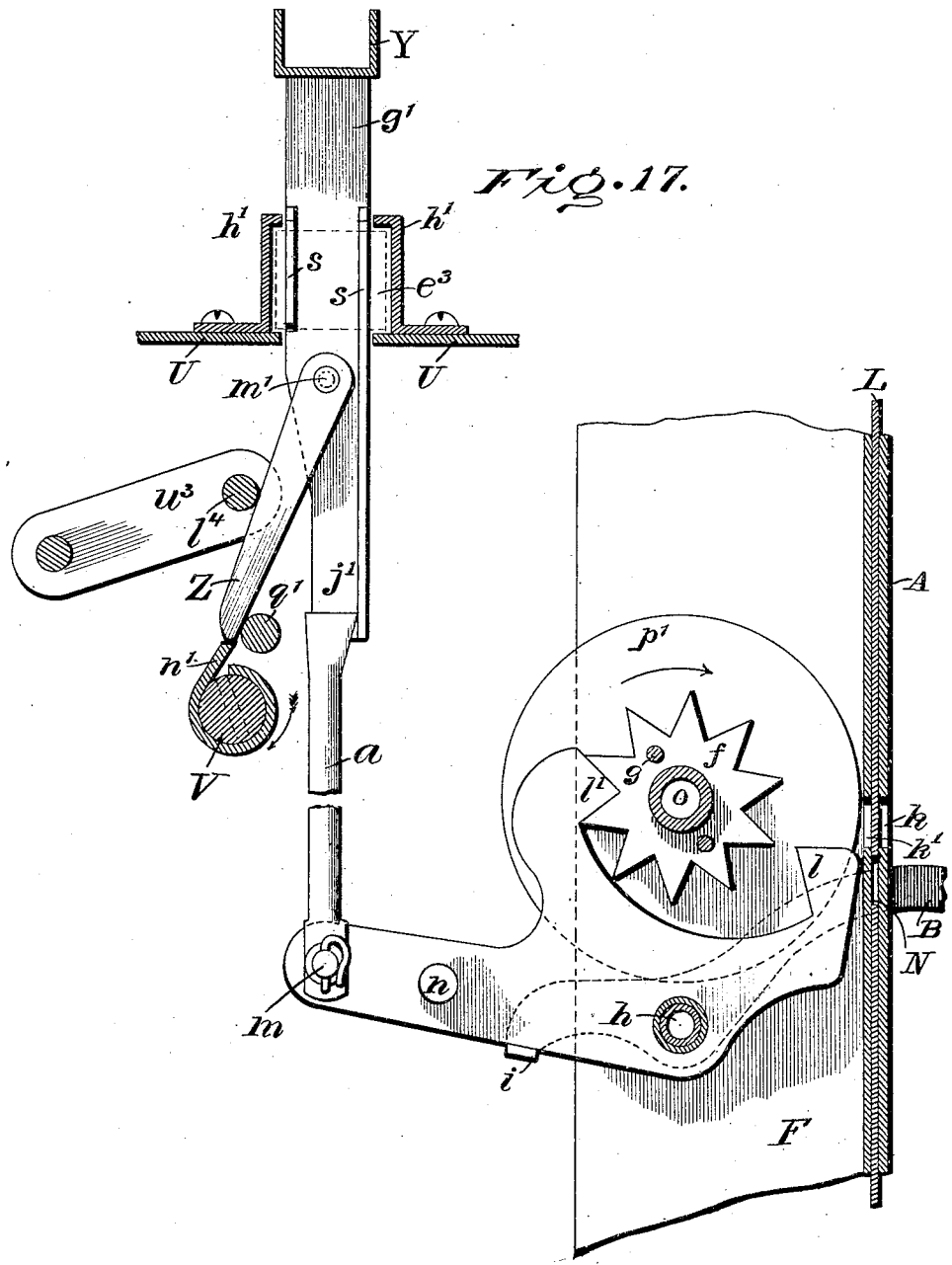

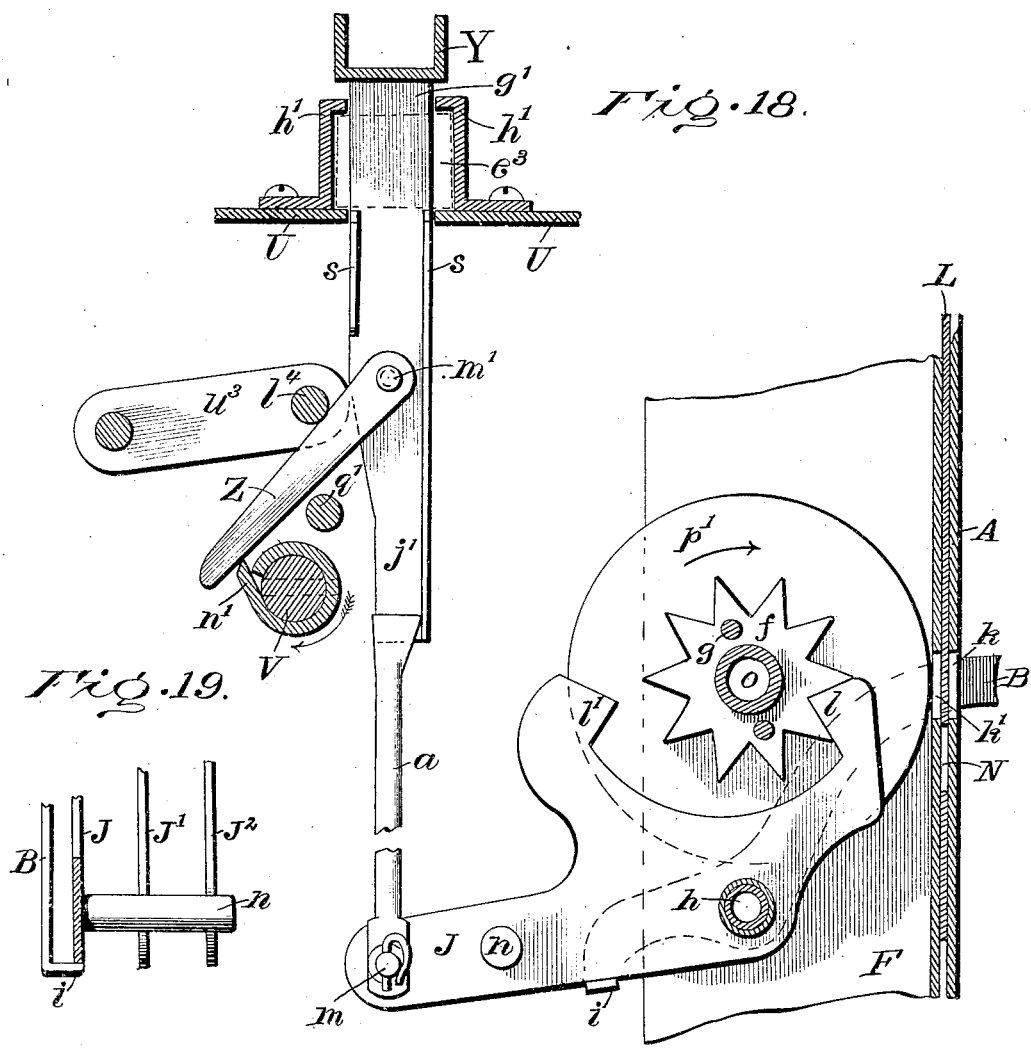

UNITED STATES PATENT OFFICE.

HENRY C. H. COOPER, OF JAMESTOWN, NEW YORK, ASSIGNOR, BY MESNE ASSIGNMENTS, TO EMPIRE VOTING MACHINE COMPANY, OF ROCHESTER, NEW YORK, A CORPORATION OF NEW YORK.

VOTING-MACHINE.

1,031,170.  Specification of Letters Patent.  Patented July 2, 1912.

Application filed March 11, 1898. Serial No. 673,483.

*To all whom it may concern:*

Be it known that I, HENRY C. H. COOPER, a citizen of the United States, residing at Jamestown, in the county of Chautauqua, in the State of New York, have invented certain Improvements in Voting-Machines, of which the following is a specification, reference being had to the accompanying drawings.

My present invention relates to certain improvements in the construction and operation of voting machines, whereby their efficiency and reliability are greatly increased.

My improvements are fully described and illustrated in the following specification and the accompanying drawings,—the novel features thereof being specified in the claims annexed to the said specification.

Figure 1:
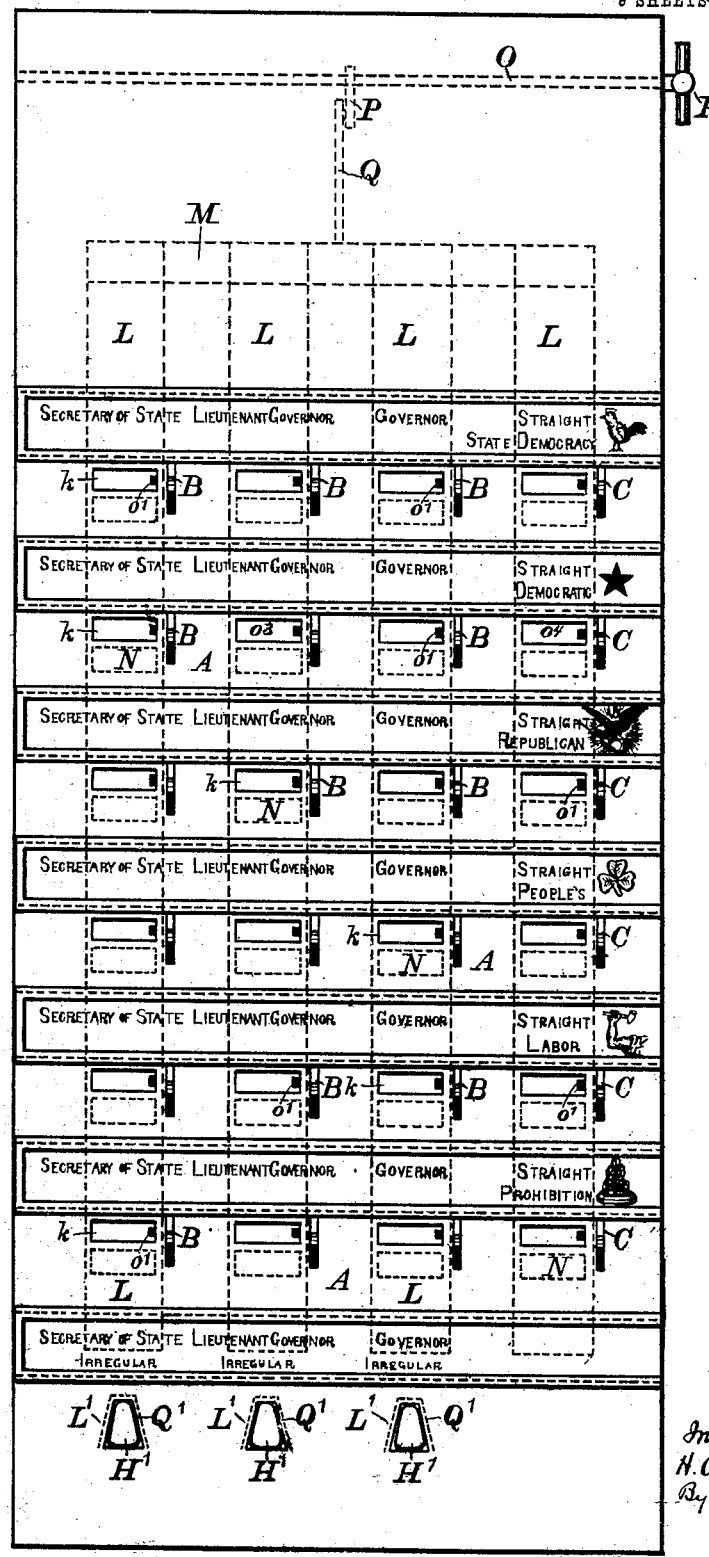
Figure 2:
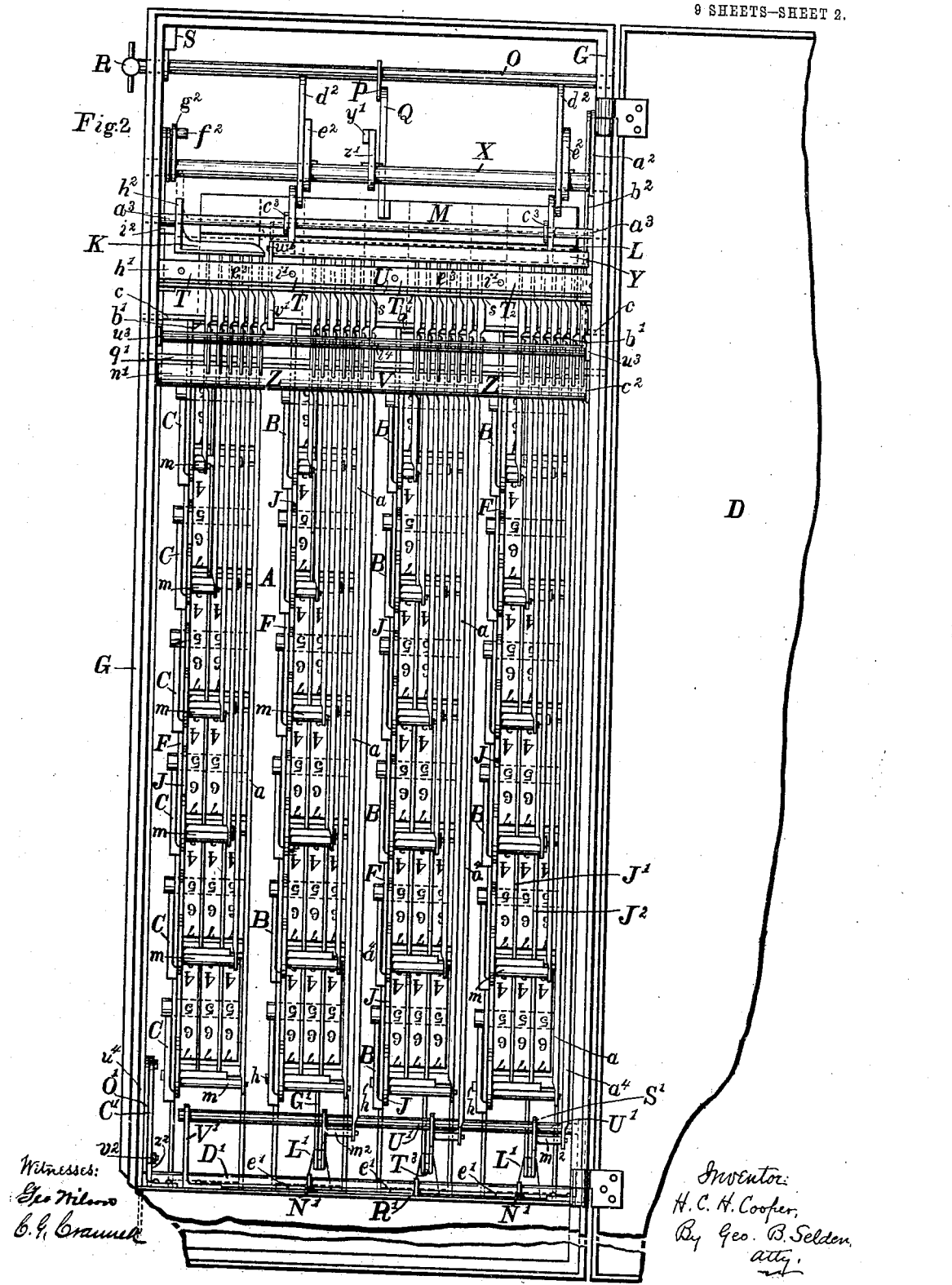

In the accompanying drawings representing a voting machine embodying my present improvements,—Figure 1 is a front elevation of the key-plate of a voting machine arranged for six parties and for candidates for four different offices,—showing also the irregular balloting device. Fig. 2 is a rear elevation of the same,—the door being open. Fig. 3 is a side elevation of my improved voting machine,—the casing next the observer being removed. Fig. 4 is a rear elevation of one of the counters. Fig. 5 is a side-view of the palleted arm, the toothed wheel and disk. Fig. 6 is a side view of one of the palleted yokes and the disk which operates it. Fig. 7 is a central vertical section on the line 7—7, Fig. 6. Fig. 8 is a side view of one of the counters as seen from the right hand in Fig. 4. Fig. 9 represents the units-disk detached. Fig. 10 is a side view of the upper part of one of the interlocking rods, showing the channel for the interlocking blocks in section. Fig. 11 is a longitudinal section through the interlocking mechanism. Fig. 12 represents the upper end of one of the interlocking-rods as seen from the side opposite to that shown in Fig. 10. Fig. 13 is a side elevation of my improved irregular balloting mechanism. Fig. 14 is a side view of the same, partially in section, showing the connection with the interlocking rod. Fig. 15 represents the cam which operates the resetting mechanism. Fig. 16 is a partial view, showing a key, counter and locking bar in the position they assume after a voter has voted. Fig. 17 represents the same parts in the position they assume when a vote is half counted. Fig. 18 is a view of the same parts, after a vote has been counted and the machine reset, and Fig. 19 is a detail view showing the relation of the lever J and the yokes $J^1$ $J^2$.

Practical experience in the holding of elections by means of voting machines shows that a certain percentage of the public, through haste, inattention or inefficiency, will fail to register on any machine which requires a full or complete movement of the push, key or other device employed to operate the registering mechanism. While few or none fail to move such device in some degree, many voters fail to impart to it a complete movement, and if registration is dependent on such complete movement, they do not register their votes. It therefore becomes very important to construct the machine so as to adapt it to this peculiarity of human nature, and in fact, to reduce the work to be performed by the voter to the minimum,—to require him to give merely an indication to the machine and to have the machine itself perform the work of operating the counters.

In my invention the actuating device is positively connected with the counter or register,—inclined pallets being adapted to engage with and operate a star or toothed wheel on each counter or register, giving it a step-by-step movement, of which two are necessary for each change from one number to the next. I arrange my machine so that both these movements are made by the resetting mechanism, which is operated by the voter after he has voted, and which serves to bring all the parts back to normal position, ready for the next voter.

My invention also includes straight-ticket voting mechanism, irregular balloting mechanism, and various other features hereinafter described in combination with the above mentioned mechanism.

My invention belongs to the positive type of voting machines, which was first shown in the patent of S. E. Davis, Sept. 25, 1894.

In the accompanying drawings, A is the key-plate, which is arranged in the vertical position so as to form one side of the voting compartment, as is usual in this class of machines, and B are the keys for selective voting. The keys C are used on the straight ticket counters. Each key is provided with a counter, and interlocking mechanism is employed between the different counters, so that only one counter in any vertical row can be actuated. In the arrangement shown, the keys corresponding to the different candidates for the same office are placed in vertical lines,—the keys for the candidates of each political party being arranged in horizontal rows. The voting booth is provided with any suitable turnstile or entrance or exit doors, and a suitable connection is arranged so that a voter after he has voted, is required to actuate the counters he has selected, and to restore the apparatus to normal position ready for the next voter. The booth is omitted in the drawings, but it will be understood that such part of the machine, if used, is arranged in any suitable or preferred way.

The key-plate is provided with a series of movable parts or keys, which may be either pushes or pulls, or as shown in the accompanying drawings, levers B, C, Fig. 1, which may be moved downward by the voter to operate the corresponding counters. The voting apparatus is inclosed within a suitable supporting frame, or box, G, which sustains the parts and protects them from injury or interference. The key-plate forms the front of the box or inclosure, and the door D the back or rear side. The keys project through slots in the plate,—being provided, if desired, (see C, Fig. 3,) with curved wings inside the plate to keep the slots closed in all positions of the keys. In the construction shown in Fig. 3, one of these wings works inside the key-plate, and the other, which is on the lower edge of the key, travels down outside the plate,—the edges of these wings being curved on a circle from the center $h$. The counters in each vertical line are supported in a removable channel or section, F, to which the keys B are also pivoted. The channel F is shaped like a trough, with its open side behind,—the front side which corresponds to the bottom of the trough being provided with apertures $k^1$ through which the counters are read off, and the two sides being perforated to support the pins or studs which carry the counters and their operating parts. The channeled sections facilitate the construction and assembling of the machine, since all the counters and their connected parts for any one vertical line may be put together on the bench and the channel then placed in the machine as a whole, ready for use,—it only being necessary to connect the interlocking rods $a$ to the levers J. The removal or replacement of the counter channels or sections is made from the front of the machine,—the key-plate A when put on serving to hold the sections in place. The base $b$ of the machine is provided with a series of lugs or projections $e^1$, of a size corresponding with the width of the channels between the sides, which lugs serve to secure the channels in place when the latter are inserted on them. A corresponding series of lugs, $b^1$, on the transverse plate $c$, serves to secure the upper ends of the channels, which are slipped onto the lugs from the front of the apparatus,—the key plate A when attached holding the channels in place on the lugs. In this way provision is made for easily inserting or removing the channels, with their counters and keys.

The method of actuating the counters will be understood from Figs. 4 to 9 inclusive. Each of the counters consists of three numbered disks, I, $I^1$, $I^2$,—of which I is the units-disk, $I^1$ the tens-disk, and $I^2$ the hundreds-disk. The disks consist of a circular plate $d$, having a flange $e$ turned or drawn on it,—the flange being marked with the figures 0 to 9 in any suitable way. The counter-disks are supported so as to revolve freely on a stud $o$ secured in the side-walls of the channels F in any suitable way. Each of the counter disks is provided with a toothed or star-wheel, $f$, which is secured to the disk by the rivets $g$. J is the palleted lever which actuates the units-disk, and $J^1$, $J^2$, the palleted yokes which actuate the tens and hundreds-disks respectively. The lever and yokes are pivoted so as to turn freely on the stud $h$ secured in the side walls of the channel in any suitable way. The key B is also pivoted on the stud $h$, which on one side extends beyond the side-walls of the channel. The key B is provided with a projecting lip $i$ at its lower end, which reaches under the lever J and causes the latter to swing on its pivot, when the outer end of the key is depressed. The lever J is made of such a shape, as shown, that when it swings, the inclined pallets $l$ $l^1$, Fig. 5, with which it is provided, engage with the teeth of the star-wheel $f$, and impart to it a step-by-step movement, of one twentieth of a revolution at each step. When the voter fully depresses the outer end of the key B, the lever J is raised and the pallet $l^1$ swings inwardly between two adjacent teeth of the wheel $f$. When the voter leaves the booth, the lever J is returned to the normal position, and this motion engages the pallet $l$ between two of the teeth of the wheel $f$, and imparts to it the second step necessary to bring the next figure into proper position relative to the aperture $k^1$ in the front of the channel F, through which the indications of the counter are visible. It will be observed that one or the other of the pallets $l$ $l^1$ are all the time engaged with the teeth of the star-wheel $f$, and that thus any accidental movement of the numbered disk is prevented. It will also be understood that, since the counting movement of the disk is not completed until the voter leaves the booth, it is impossible to repeat a vote, or otherwise tamper with the counter. At its rear end the lever J is provided with a stud m, to which the interlocking rods a are pivoted. These studs m are made of different lengths, the shortest being on the lever of the upper counter, in the construction shown, as indicated in the rear view, Fig. 2, so that the interlocking-rods, a, are straight and parallel with each other,—each lower stud m being enough longer than the one next above it, to allow its interlocking rod to pass by the rod attached to such higher stud. The lever J also carries a stud n, which produces the return movement of the yokes J¹ J², when the apparatus is reset to normal position. These studs n are all of the same length, extending over both of the yokes.

When the units-disk I has made a complete revolution, it is necessary to shift the tens-disk I¹ a tenth of a revolution. This is accomplished by a swinging movement of the palleted yoke J¹, which is moved in one direction by the units-disk I and in the opposite direction by the stud n on the lever J. The pallets l² l³ of the yoke J¹ act on the teeth of the star-wheel f¹, which is attached to the tens-disk I¹. The pallet l² of the yoke J¹ is provided with a pin, p, which projects into the open space and encounters the inclined flange q, by which the pin p is forced outward,—this movement disengaging the pallet l² from the star-wheel, and engaging the pallet l³ with it on the opposite side, thereby imparting one-twentieth of a revolution to the wheel f¹ and the tens-disk I¹. The flange q is so placed on the units disk, relatively to the figures on the flange, that it encounters the pin p at the time the units counter, as viewed through the aperture k, is changing from 9 to 0,—at which time the tens-disk should change from 0 to 1. The flange is attached to the units disk in any suitable way, such as the rivets g, which fasten the star wheel to the disk. In Fig. 9, a plate is indicated by the dotted lines t, which may be secured to the units-disk by the rivets g,—the flange q being bent up from such plate. A circular flange, u, Fig. 9, may also be employed, of a diameter sufficient to pass just outside the pin p, which operates to prevent any accidental movement of the yoke J¹ when the lever J is raised. In this case the flange u should be cut away just in front of and behind the flange q, to permit the movement of the pin, and the two flanges may be formed in one piece and secured to the disk by the rivets g as before described. The flange u may be bent outward, as indicated by the dotted lines u¹, Fig. 9, so as to insure the engagement of the pin p inside of it. The yoke J¹ is pivoted so as to swing freely on the stud h, and it is extended upward between the disks, as indicated at v, to prevent the disks from coming in contact with each other. The return movement of the yoke J¹, which completes the counting movement of the tens-disk, is secured by the downward motion of the lever J, acting through the stud n on the upper edge of the arm w on the yoke.

The method of imparting one-tenth of a revolution to the hundreds-disk I², when the tens-disk I¹ has made a complete revolution, is similar to that already described for operating the tens-disk from the units-disk. The tens-disk I¹ is provided with a flange like q, and the yoke J² is provided with a pin corresponding to pin p. The operation of the parts is exactly similar to that already described. The yokes J¹ and J² are interchangeable with each other, and so also are the disks I¹ and I², except that the latter, in case only three counters are used, counting up to 999, need not be provided with the flange q.

Provision may be made for setting the counters at 999 or 000 at the beginning of an election in any suitable way.

Provision may be made for displaying the numbers on the counters at the end of an election, by the movable shutters L, having apertures N, which register with openings k through the key-plate. The shutters L are connected together by a bar M and operated from a handle R by a rock-shaft O, lever P and connection Q. A lock S may be employed to fasten the shutter in either its open or closed position.

The construction and operation of the interlocking mechanism will be understood from Figs. 2, 3, 10, 11, and 12. Each of the levers J is pivoted to an interlocking-rod, a, and these interlocking-rods are provided near their upper ends with the thickened or wedge-like portions a, which when one of the rods is raised by the operation of its key, force the interlocking-blocks e³, Fig. 11, apart, so that they fill the whole space between the abutments T T¹, and thus prevent the raising of any other rod and the actuation of any other key in the same vertical line. The blocks e³, are slightly movable laterally in their supports, and the rods a are permitted also the requisite amount of lateral movement. The upper parts g¹ of the interlocking rods and the blocks are made of such thickness, that, when one of the wedges s is thrust in between them, the rods at each side of the series bear against the abutments T T¹, and none of the other wedges can be inserted, so that the voter finds it impossible to vote for more than one of the candidates for any particular office. The lower ends of the interlocking blocks are preferably rounded or beveled. The bar U extends across the machine, being sustained in any suitable manner, and supports the blocks and the abutments. The blocks are made somewhat wider than the upper portions of the interlocking-rods, as indicated in Fig. 10,—so that they rest at their lower corners on the bar U,—which is perforated to allow the rods to pass through it. The channel $h^1$ serves to hold the blocks in place on the bar U,—being provided with flanges which are fastened to the bar. The abutments are prevented from moving lengthwise in the channel, by the bolts, screws or pins, $i^1$, which pass through the vertical sides of the channel. These pins or screws are made removable, for the purpose of adapting the machine to multicandidate or group voting, as hereinafter described. The interlocking-rods $a$ may be hollow, being formed by drawing a metallic strip of suitable width through a die, and having their lower ends flattened and perforated, for attachment to the studs $m$ of the levers J. At their upper ends, the tubular rods are brazed or otherwise secured to the strip $j^1$, which has its edges turned over to form the wedge or wedges $s$, and to which the trips Z are pivoted, at $m^1$, Figs. 10 and 11. At their upper ends, the strips $j^1$ form the thin portions $g^1$ which are located between the interlocking blocks $e^3$, and by which the interlocking rods are held in line and in proper engagement with the interlocking blocks. In the particular construction shown, the strips $j^1$ are secured to the tubular rods by having their lower ends inserted and brazed in the longitudinal joint of the hollow rods.

When one of the interlocking rods is raised by the actuation of its corresponding key and counter, the catch or dog Z engages with the trip-shaft V, and holds the rod elevated until the apparatus is restored to normal condition by the voter while passing out of the booth. The key will not remain depressed or the rod elevated, until the dog has engaged with the trip-shaft, so that the voter knows that he has not properly operated the machine, until the key stays down,—the weight of the interlocking rods and attached parts serving to return the key from any position to which it may have been moved, until the dog is actually engaged with the trip-shaft. The shaft V is provided with a projecting lip $n^1$, with which the point of the dog Z, engages, as indicated by the dotted lines in Fig. 10. A partial downward movement of the key will engage the dog with the lip, and the rolling motion of the trip-shaft will then raise the rod further and produce the first step of the movement of the units disk. A stationary rod $q^1$, extending across the machine, between the dogs and the interlocking-rods, prevents the dogs from moving too far, and another movable rod or bar $l^4$ rests on the upper or rear side of the dogs. This rod $l^4$ is hung on arms $u^3$ pivoted to the frame of the machine and serves to prevent any unnecessary movement of the dog, which may also be accomplished by carrying the flange $s$ down, as indicated at $s^1$, Fig. 12, so that it will arrest the movement of the dog at its farthest point. The dog is tripped and the rod raised and released by the partial rotation of the trip-shaft V in the direction indicated by the arrow in Fig. 10,—the lip moving toward the rod,—by the movement of the door or turnstile as the voter passes out of the voting-compartment. Any suitable means of securing this result may be adopted, but in the arrangement shown, the shaft or pintle W, Fig. 3, of the door or turnstile is provided with a cam or crank, $x^1$, which, through the connection $y^1$ and crank $z^1$, imparts a partial rotation to the rock-shaft X, which, by crank $a^2$, connection $b^2$ and crank $c^2$, transmits the requisite movement to the trip shaft V. The rock-shaft X extends across the machine, being supported in any suitable journals. The cranks $a^2$ $c^2$ and connection $b^2$ may be located at one end of the machine, and either inside or outside the casing. It is needless to remark that any connections or moving parts outside the case should be protected so that they cannot be interfered with. As the trip-shaft V turns, the lip $n^1$ raises the dog and rod, and passing underneath the point of the dog, allows it to escape from its engagement, so that the rod and dog may resume their normal position, as indicated by the full lines in Fig. 10. This up and down movement is transmitted to the units disk. Provision is made for restoring the parts to their normal position by the movable bar Y, which extends along over the interlocking rods, and may rest thereon. When one of the interlocking rods is raised, the bar Y is elevated, (see full and dotted lines Figs. 2 and 11,) and it remains in that position until forced downward positively by the movement of the door or turnstile as the voter leaves the voting compartment. This movement is secured from the rock-shaft X, but, as it is necessary that the dog or dogs Z should be unlocked before the rod or rods are depressed, the construction is such that the trip-shaft V is moved first. This is secured by the slots in the links $d^2$, Figs. 2 and 3, which permit the cranks $e^2$ to move a certain distance, (during which time the dogs are unlatched by the trip-shaft V,) before the bar Y is depressed, by the pins in the cranks $e^2$ arriving at the lower ends of the slots. The bar Y is then pressed downward, and, acting on the ends $g^1$ of the interlocking-rods, forces them back to their normal positions, completes the movement of the counters, and restores all parts of the machine to the position necessary for the next voting operation.

I provide for straight-ticket voting,— that is the case when a voter desires to vote for all the candidates of any one party, by arranging a row of keys, levers and counters, preferably at one side of the selective-voting-mechanism, so that the voter can indicate his political preference by a single movement, thereby reducing the time occupied in voting and increasing the capacity of the machine. Suitable interlocking mechanism is employed between the straight-ticket and the selective-voting mechanism, so that, a voter, having actuated the straight ticket counter of any political party, cannot thereafter vote for any of the candidates either of his own or any other party. In this case, in order to ascertain the total vote, it will be necessary at the close of the election, to add the number shown on the straight-ticket counter to the number indicated by the counter devoted to any particular candidate of the same party,—the sum of these numbers giving the whole vote cast for such candidate. Thus, suppose it be required to find the vote for the republican candidate for lieutenant governor, the number of the counter at $o^3$, Fig. 1, is added to the number on the counter at $o^4$,—and the sum of these numbers represents the whole vote for this candidate. In a similar manner, the vote for any other candidate is determined.

The keys for actuating the straight-ticket counters are represented at C in the accompanying drawings,—the counters being of the same construction as those already described, mounted in a removable section F, and provided with interlocking-rods, locking dogs and interlocking-blocks in a manner similar to that previously set forth. The interlocking with the selective-voting counters is provided for by attaching a wedge or interlocking rod $v^1$, Fig. 2, to the bar Y and arranging such wedge in relation with the interlocking blocks $e^3$ and their abutments of the straight-ticket counters, so that, when the bar Y is raised by one of the interlocking-rods, of any of the selective-voting counters, none of the straight-ticket counters can be operated,—the space between the abutments being fully occupied, so that none of the rods of the straight-ticket counters can be raised. On the contrary, when one of the straight-ticket counters has been operated, the wedge $v^1$ cannot be inserted between the abutments, the bar Y cannot be raised, and consequently none of the selective-voting counters can be actuated. It will be seen that by this arrangement, provision is made for positively interlocking the straight-ticket counters and the selective voting mechanism, so that no voter can operate both simultaneously. The wedge $v^1$ is provided with a thin shank which extends up through the bar U and is pivoted to the bar Y at $w^1$, Fig. 2. The bar Y is arranged to move up and down in suitable guides, or it may be swung by arms $c^3$ pivoted on a transverse shaft $a^3$, Figs. 2 and 3. In order to restore the straight-ticket counters to normal position, I use the pivoted plate K which is lifted up by any one of the interlocking rods, and is forced downward by the pin $f^2$ on the arm $g^2$ on the rock-shaft X, (see Fig. 3.) The plate K extends over all the interlocking-rods of the straight ticket counters, and is provided with a flange $h^2$ which is pivoted to the frame, at $i^2$, and extends upward into the path of the pin $f^2$. It will be observed that, when the rock-shaft X moves, the trip-shaft V will be operated before the pin $f^2$ encounters the flange $h^2$. The trip-shaft, and its longitudinal flange or ledge $n^1$, are conveniently formed by bending a strip or suitable metal around a shaft, leaving the ledge to project, and by securing the parts together by pins or screws.

In order to provide for the irregular-vote,—that is for the votes which may be cast for persons not put in nomination by any of the political parties, I furnish the irregular voter with a box or ballot-holder, of any suitable or preferred form, and the voter, having placed his ballot, either written or printed, in the holder, inserts the latter in an opening in the key-plate, which operates the interlocking mechanism so that the voter cannot vote for any other candidate for the same office, and then, when the votes leaves the booth, the ballot-holder, is delivered into the ballot-receptacle. The ballot holder may be round or flat, and open at one end, or separable in any suitable way. In Fig. 1 of the accompanying drawings, I have represented the orifice $Q^1$ for the insertion of the ballot-holder as having the form of a truncated cone, and the holder $H^1$ of a corresponding form. Behind the key-plate is placed a suitable inverted trough or guide $L^1$, which is provided at the bottom with the movable door or support for the holder, $N^1$, Figs. 13 and 14. The inclination of the sides of the guide outward, prevents the stuffing of it with paper or waste,—since anything which will not fall out of it when the door $N^1$ swings downward, will be ejected by the return movement of the plunger $P^1$. The door swings downward and opens the bottom of the guide, and returns to place before the plunger is moved. The guide is conveniently formed of sheet metal, being provided with suitable flanges by which it is attached either to the key-plate, or to the bed $R^1$, Figs. 13 and 14. Or the ballot holder-guide may be attached to the channeled sections already described, which sustain the counters of each vertical line. When the ballot-holder is inserted in the guide, the plunger $P^1$ is forced backward, as represented by the full and dotted lines in Fig. 14, and this movement is transferred to the interlocking rod $a^4$ by the bell-crank lever $S^1$. The irregular interlocking rod $a^4$ is provided at its upper end with the wedge and trip, the same as the interlocking rods already described, and it operates in the same way, to prevent voting for any regular candidate in the same vertical line,—the only difference being that in a machine arranged for handling the votes of six political parties, if the irregular voting mechanism is employed, there will be seven interlocking rods and their corresponding interlocking blocks and other parts. When the rod $a^4$ of the irregular voting device is thrust upward, its wedge fills the alloted space between the interlocking blocks, and none of the other interlocking rods of the same series can be operated, and consequently none of the counters in the same vertical line can be operated. It will also be observed that if one of the straight ticket counters is operated, the irregulars are then locked out, and vice versa. Consequently the simultaneous use of any of the straight-ticket-counters, and any of the irregulars, is prevented. Each of the irregular plungers $P^1$ is provided with a lever $S^1$ and an interlocking rod $a^4$. The levers $S^1$ are pivoted on a rod $U^1$ extending across the machine and supported at its ends, and intermediately, if required, by the brackets $V^1$ attached to the bed $R^1$. At one end the levers $S^1$ are pivoted to the corresponding interlocking rods, and at the other, and to the arms $T^3$ attached to the plunger $P^1$. Each plunger and its arm may be made in one piece, or connected together in any suitable way. The levers $S^1$ are each provided with a stud $m^2$, Fig. 3, which brings the interlocking rods $a^4$ outside of the rods $a$ of the selective-voting counters. The plunger may be arranged to slide in any suitable guides, and for this purpose its stem may be a straight rod, but I prefer to swing it on the link $G^1$, Figs. 3, and 14, which may be conveniently pivoted on the stud $h$ of the lowest counter, which is next above the irregular mechanism. The plunger and its stem being thus supported by the link $G^1$ and the long arm of the lever $S^1$, will travel in a course sufficiently straight for its purpose. When the restoring bar Y, Fig. 2, descends, the interlocking rods $a^4$ are forced downward, and the plungers $P^1$, if any have been used, are returned to the normal position, indicated by the full lines in Fig. 14. But before this occurs, as already described, the trip-bar is rocked, and the dogs Z are unlocked, and advantage is taken of this to open and close the doors $N^1$ at the bottom of the ballot-holder guides before the plunger is returned by the descent of the bar Y. This is accomplished by the slotted plate $Z^1$, which is actuated by connections with the door or turnstile, or with the rock-shaft X, and is arranged to act on the lever $C^1$ which is connected with the rock-shaft $D^1$ to which the doors $N^1$ are secured.

It will of course be understood that suitable openings are made in the bed $R^1$ to permit the doors $N^1$ to swing downward, as indicated in Figs. 14 and 13. In the particular arrangement shown, the rock-shaft X is provided with an arm $F^1$ and connection $K^1$, Fig. 3, which operates the sliding plate $Z^1$. This plate is arranged to slide in any suitable guides and it and its connected parts may be duplicated at each end of the machine. Its lower end may be guided by an opening in the bed $R^1$, while its upper end slides in any suitable ways on the side-frame of the machine. As the plate $Z^1$ descends, it actuates the lever $C^1$ by means of a double inclined slot so as to open and close the door at the bottom of the ballot-holder guide before the plunger is returned by the descent of the bar Y. The slot in the plate is indicated at $X^1$, Figs. 3 and 13, and it acts on the pin $u^4$ on the lever $C^1$, which is connected with the rock-shaft $D^1$ by the link $v^2$ and the crank $z^2$. The slot $X^1$ has a double inclined portion, $t^2$, $t^3$, at its lower end, which acts on the pin $u^4$ on the lever $C^1$ to swing it first one way and then in the other, which motion is transmitted to the rock-shaft $D^1$ to open and close the door $N^1$ at the bottom of the guides for the ballot-holders. The lever $C^1$ swings on a pivot, $j^2$, carried by the side-frame of the machine, or, as in the construction shown, by the standard $O^1$ fastened to the bed $R^1$. In this arrangement the bracket $O^1$ is provided with a slot, $d^3$, Fig. 13, to permit the movement of the pin $u^4$. As the rock-shaft X turns and the slotted plate $Z^1$ descends, the first action of the slotted plate is to open and close the door $N^1$, after which the straight part of the slot $X^1$ holds the door closed during the remaining portion of its travel. The door is opened and closed when the voter enters the booth and the plate $Z^1$ is raised, but this movement has no effect on the voting, either straight-ticket, selective or irregular. The interior of the ballot-holder guide, is given a form corresponding with that of the opening $Q^1$ in the key-plate, and the upper part of the ballot-holder guide $L^1$ is slotted to permit the movement of the arm $G^1$. The return of the door $N^1$ before the plunger $P^1$ moves, insures the ejection of any articles or substance which may have been maliciously inserted in the guide $L^1$. When the irregular device is applied to the channeled section, the front of the section is provided with an opening corresponding in shape with $Q^1$ in the key-plate. Below the doors $N^1$ the machine is provided with suitable chutes by which the ballot-holders are guided during their delivery into the ballot-receptacles at the base of the machine,—which receptacles are kept locked during the election, to be opened at its close to allow the election-inspectors to ascertain the scattering or irregular vote, by counting the ballots in the ballot-holders. In case of any irregularity in any of the irregular votes,—such as two names on the same ballot,—such vote will be rejected.

It will of course be understood that my improved voting machine will be provided with as many sections or lines of counters, (with irregulars, if desired), as there are offices to be filled at any election at which the machine is to be used. In order to adapt the machine to multicandidate voting,—that is, where each party has the right to nominate two or more candidates for the same office, one or more of the pins $i^1$ between the abutments T $T^1$ $T^2$ are removed,—so as to allow lateral movement in the channel $h^1$ to the abutment which is normally held in place by the pin. Suppose it is required that the machine be adapted to a multicandidate group of two,—that is, where two candidates for coroner, say, are nominated by the same political party,—then the pin $i^1$ in the abutment $T^2$, Fig. 2, is removed, and this abutment is thus allowed a certain amount of lateral movement. Under this arrangement, any two of the interlocking rods in the right hand section of Fig. 2, can be thrust upward, or any two in the next adjacent section, or any one in one of the sections, and any one in the other, but after two such rods have been operated, no others in either of the sections can be thrust upward. The voter therefore can vote for any two candidates out of the twelve, and he cannot vote for more than two. He can also use either or both irregulars, which are interlocked in the group. It will be obvious that by removing two or more of the pins $i^1$ the system may be extended to multicandidate groups where three or more candidates are proposed by the same party for the same office.

In Fig. 15 I have shown a cam of a form which I have employed in connection with a turnstile to secure the proper motion of the connection $y^1$ and rock-shaft X. It will be understood that the rock-shaft may be operated by any suitable mechanism from the door or turnstile of the voting compartment.

It will be obvious to the skilled constructor that many alterations or changes from the inventions herein described may be made, without departure from the fundamental principles thereof. Thus any suitable form of counter or register may be used, and the actuator may be a push, a pull, a lever or swinging key of any suitable or preferred kind, and it may be arranged or connected so that the counters are operated in any suitable manner. The straight ticket counters may be of a construction different from the selective-voting counters, and they may be arranged horizontally instead of vertically. Any other suitable straight ticket voting-mechanism can be employed. The arrangement of the connections between the turnstile and inlet or outlet doors and the restoring or resetting mechanism may be of any preferred kind. The interlocking mechanism may be variously modified, and it may be arranged above or below or at one side of the counters, and it may be made to work by a pull instead of by a thrust. The keys and operating levers may be made in one piece. Some of the improvements herein described may be employed in connection with a voting machine which reads from the back or rear. The studs $m$ may be dispensed with,—the levers being bent to properly connect with the interlocking rods. Any suitable locking devices may be employed on the interlocking rods, and any suitable tripping mechanism. Rollers may be employed for the interlocking blocks. The relative arrangement and dimensions of the star-wheels, counters, levers, pallets and yokes may be varied. The counter disks may be placed on separate axes, instead of upon one as shown. Any suitable irregular mechanism may be employed. The counters may be supported in any suitable way without the use of the channels. And the resetting or restoring mechanism may be of any suitable arrangement or construction. The movement of the actuator may be reduced to the least possible amount sufficient to engage the selected counter with the resetting mechanism.

It will be understood that, instead of using the shaft $U^1$, the lever $S^1$ of the irregular plunger may be pivoted on a suitable stud carried by an arm or arms $n^2$, Fig. 14, attached to the section F. In this case the irregular device can be inserted in the machine along with the channel,—it being only necessary to connect the interlocking rod $a^4$. The guide $L^1$ is attached to the section in any suitable way,—as by the flanges $x^2$, Fig. 14. As the guide $L^1$ is not as wide as the channel F the opening for the door $N^1$ is formed through the lug $e^1$ at the lower end of the section. The parts of this lug then project between the guide and the inside of the section, so as to secure the latter in place.

In my former Patent No. 614,419, dated November 15, 1898, it was left uncertain whether or not the counter was partially operated when the key was moved by the voter, and hence said patent was reissued on November 28, 1899, No. 11792, to cover among other things a counter partially operated when a key was moved by a voter, leaving for the present application the case in which the counter is not operated when the key is moved by the voter.

I claim:

1. In a voting machine, the combination of voting keys, corresponding positively actuated registering devices, mechanism for actuating each registering device, said mechanism preventing the movement of the registering devices except as moved by said mechanism, an operative connection between each voting key and the corresponding actuating mechanism of the registering devices, to shift said mechanism without operating the registering device by means thereof, and means for simultaneously actuating each of such mechanisms which have been so shifted, to operate the corresponding registering devices, said registering devices being incapable of being advanced more than one number for each operation of said actuating means.

2. In a voting machine, the combination with positively operated counters arranged in groups, of actuators therefor, adapted to be moved by a voter into cooperative relation with the counters but incapable of direct actuation by the voter to move the counter, said actuators preventing the movement of the counters except when moved by said actuators, and means controlling access to the actuators and adapted to move said counter actuators to operate the corresponding counters one number and return the actuators to their original position during a complete cycle of operations of the machine.

3. In a voting machine, the combination with a plurality of ballot indicators and interlocking devices to prevent the operation of more than a predetermined number of said indicators, of an equal number of positively actuated counters, counter actuators therefor, said counter actuators preventing the movement of the counters except when moved by said counter actuators, and said counter actuators being capable of being set in operative relation with the counters by the movement of the indicators, but incapable of movement by the indicators to actuate the counters, and means for effecting the simultaneous operation of the actuators and the return of the indicators to their original position.

4. In a voting machine, the combination of positively actuated counters, counter actuators therefor, said counter actuators preventing the movement of the counters except when moved by said actuators, voting keys adapted to be operated by the voter to move the corresponding counter actuators in operative relation with their corresponding counters, but not to actuate said counters, and resetting mechanism.

5. In a voting machine, the combination with a positively actuated two-step counter, of mechanism adapted to produce the two-step movement, and a movable key or indicator which moves said mechanism into operative relation with said counter at the will of the voter but does not operate said counter thereby.

6. A voting machine in which there is combined a series of normally locked step-by-step counters, counter actuating mechanism, movable keys or indicators which move said mechanism into operative relation with the selected counters before the operation of such mechanism and suitably interlocked straight ticket voting mechanism.

7. A voting machine in which there is combined a series of normally locked step-by-step counters, counter actuating mechanism, movable keys or indicators which move said actuating mechanism into coöperative relation with the selected counters without operating said counters, and suitably interlocked irregular voting mechanism.

8. A voting machine in which there is combined a series of normally locked step-by-step counters, counter actuating mechanism, and a movable key or indicator which may be operated to connect the selected counter with the actuating mechanism before the operation of such mechanism, suitably interlocked straight ticket voting mechanism and suitably interlocked irregular voting mechanism.

9. A voting machine in which there is combined two or more series of two or more normally locked step-by-step counters in each series, suitable counter actuating mechanism, a movable key or indicator for each counter which may be operated to connect the selected counters with the actuating mechanism before the operation of such mechanism and two or more interlocked irregular voting mechanisms, one for each series of counters.

10. The combination, in a voting machine, of positively operated counters, keys movable by the voter to indicate votes, positively-acting counter actuators for moving said counters, controlled by said keys, but moving to register votes subsequent to the movement of said keys by the voter, and means operated by the voter to give a back and forth movement to said counter actuators to count the votes indicated and reset the voting mechanisms.

11. In a voting machine, the combination of two-step counters arranged in groups, and positively acting counter actuators therefor, said counter actuators being adapted to be moved by a voter into operative relation with said counters without operating the same.

12. In a voting machine, the combination with a positively actuated two-step counter, of mechanism adapted to produce the two-step movement, and a movable key or indicator which moves said mechanism into operative relation with said counter at the will of the voter but does not operate said counter thereby, and means for effecting the simultaneous operation of the actuators and the return of the indicators to their original position.

13. In a voting machine, the combination of two-step counters arranged in groups, and positively acting counter actuators therefor, said counter actuators being adapted to be moved by a voter into operative relation with said counters without operating the same, and means for effecting the simultaneous operation of the actuators and the return of the indicators to their original position.

HENRY C. H. COOPER.

Witnesses:
  GEO. WILSON,
  GEO. B. SELDEN.

Copies of this patent may be obtained for five cents each, by addressing the "Commissioner of Patents, Washington, D. C."